United States Patent [19]

Niederdellmann et al.

[11] Patent Number: 4,656,199

[45] Date of Patent: Apr. 7, 1987

[54] PROCESS FOR THE PRODUCTION OF MATTE, NON-BLOCKING, THIN-WALLED MOLDED ARTICLES FROM LINEAR THERMOPLASTIC POLYURETHANE ELASOTOMERS CONTAINING POLYADDUCTS AND THEIR USE

[75] Inventors: Georg Niederdellmann, Dormagen; Wilhelm Goyert, Cologne; Bernd Quiring, Leverkusen; Hans Wagner, Dormagen, all of Fed. Rep. of Germany

[73] Assignee: Bayer Aktiengesellschaft, Leverkusen, Fed. Rep. of Germany

[21] Appl. No.: 824,337

[22] Filed: Jan. 30, 1986

[30] Foreign Application Priority Data

Feb. 12, 1985 [DE] Fed. Rep. of Germany ....... 3504671

[51] Int. Cl.$^4$ ............................................. C08G 18/14
[52] U.S. Cl. ..................... 521/79; 264/45.2; 264/45.5; 264/45.9; 264/46.3; 264/51; 264/54; 264/175; 264/176 R; 264/176.1; 264/177.1; 521/80; 521/114; 521/115; 521/116; 521/163; 521/170; 521/173; 521/174; 521/176; 524/724; 524/728; 524/750; 524/755
[58] Field of Search ................... 521/79, 80, 114, 115, 521/116, 163, 170-173, 174, 176; 524/722, 724, 728, 750, 755, 759, 761, 762, 775; 264/45.2, 45.5, 45.9, 46.3, 51, 54, 175, 176 R, 177 R

[56] References Cited

U.S. PATENT DOCUMENTS

| | | | |
|---|---|---|---|
| 3,360,495 | 12/1967 | Muller et al. | 260/33.2 |
| 4,089,835 | 5/1978 | Konig et al. | 260/31.6 |
| 4,093,569 | 6/1978 | Reischl et al. | 260/2.5 |
| 4,147,680 | 4/1979 | Reischl et al. | 260/29.2 |
| 4,250,292 | 2/1981 | Niederdellmann et al. | 528/44 |

FOREIGN PATENT DOCUMENTS

| | | |
|---|---|---|
| 1964834 | 12/1969 | Fed. Rep. of Germany . |
| 2519004 | 11/1976 | Fed. Rep. of Germany . |
| 1274878 | 5/1972 | United Kingdom . |
| 1598967 | 9/1981 | United Kingdom . |

OTHER PUBLICATIONS

Becker/Braun, Kunststoff-Handbuch, vol. 7, "Polyurethane", Carl Hanser Verlag, Munich-Vienna, 1983, pp. 428-440.

*Primary Examiner*—Maurice J. Welsh
*Attorney, Agent, or Firm*—Gene Harsh; Joseph C. Gil; Thomas W. Roy

[57] ABSTRACT

The present invention is directed to a process for the production of matte, non-blocking, thin-walled molded articles, films or tubes from polyurethane elastomers prepared from high molecular weight polyols which contain dispersed polyadducts based on polyisocyanate polyaddition products. The use of these high molecular weight polyols contained dispersed polyadducts allows for the preparation of thin-walled, molded articles which have reduced surface tackiness. The present invention is additionally directed to the molded articles produced by this process and to their use for forming polyurethane foam composites.

10 Claims, No Drawings

PROCESS FOR THE PRODUCTION OF MATTE, NON-BLOCKING, THIN-WALLED MOLDED ARTICLES FROM LINEAR THERMOPLASTIC POLYURETHANE ELASOTMERS CONTAINING POLYADDUCTS AND THEIR USE

BACKGROUND OF THE INVENTION

1. Field of the Invention

The present invention is directed to a process for the production of matte, non-blocking, thin-walled molded articles, films or tubes from polyurethane elastomers, the elastomers produced therefrom and their use for back-foaming with polyurethane foams.

2. Description of the Prior Art

Thermoplastic polyurethane elastomers have long been of technical importance on account of their combination of valuable mechanical properties and high chemical resistance and the ease with which they can be worked up economically by thermoplastic processes (see Becker/Braun, Kunststoff-Handbuch, Volume 7; Polyurethane, Carl Hanser Verlag, Munich-Vienna 1983, pages 428 to 440). When thermoplastic processes are applied to polyurethanes which have not been cross-linked (especially soft polyurethanes with Shore A hardnesses below 95), difficulties arise in the production of thin-walled articles due to severe blocking and sticking when attempts are made to remove the products from the mold. This difficulty occurs particularly in the production of films, thin-walled tubes and molded articles from linear, thermoplastic PU elastomers (TPU) by extrusion, calendering or blow molding. Also, the considerable surface tackiness of soft TPU foils often severely restricts their possible uses.

The usual addition of so-called internal release agents such as stearylamines, stearyl urethanes or stearyl urea and the less commonly practiced addition of inorganic anti-blocking agents such as chalk, talcum, diatomaceous earths and the like are equally unsatisfactory for solving this problem. Further, the last mentioned fillers generally cause a deterioration in the properties of the TPU (e.g. loss of resistance to hydrolysis and appearance of processing difficulties such as the formation of blisters on the surface due to moisture adhering to the fillers). Moreover, the internal release agents melt at the high processing temperature and are liable to migrate from the molded product when used at the high concentrations required. In particular, they give rise to difficulties when TPU foils are bonded or glued or back-foamed.

It is an object of the present invention to provide non-blocking, matte, thin-walled molded articles having wall thicknesses below about 2 mm, preferably about 5 $\mu$m to 500 $\mu$m, in particular about 20 $\mu$m to 200 $\mu$m, by the extrusion, calendering or blow-molding of substantially linear, thermoplastic polyurethanes without the usual disadvantages of soft, thermoplastic polyurethanes and with the advantage that the polyurethanes used would form a rapidly solidifying melt which would readily separate from the mold and give rise to matte, homogeneous, thin-walled molded articles such as sheets, films or tubes which would have a dry, non-blocking surface and would therefore be immediately ready for further processing, e.g. films or tubes could be immediately rolled up. It is also an object to provide thin-walled molded products, in particular films or tubes, which do not stick together or block and yet when used as outer skin, film or molded structure adhere firmly to polyurethane foam systems foamed up inside them or on their suface so that a firm bond is obtained between the film and the foam system.

This object was surprisingly achieved by using substantially linear thermoplastic polyurethanes obtained from mainly relatively high molecular, difunctional compounds containing isocyanate reactive groups and having molecular weights of 400 to about 10,000 and melting points below about 60° C., preferably relatively high molecular weight diols in which relatively small quantities of selected, high melting polyisocyanate polyaddition products ("polyadducts") are dispersed and remain dispersed in a finely divided state in the polyurethane elastomer matrix after processing.

SUMMARY OF THE INVENTION

The present invention is directed to a process for the production of matte, non-blocking, thin-walled molded articles, films or tubes from polyurethane elastomers based on (A) dispersions containing
  (Ab) relatively high molecular weight, high melting polyisocyanate polyaddition products dispersed in
  (Aa) relatively high molecular weight, polyfunctional compounds containing isocyanate reactive groups with Zerewitinoff-active hydrogen atoms and having molecular weights of 400 to about 10,000 and melting points below 60° C., (B) chain lengthening agents containing two Zerewitinoff-active hydrogen atoms and having a molecular weight of 18 to 399 and (C) diisocyanates, characterized in that (I) the polyurethane elastomers used are thermoplastically processible polyurethane elastomers having a substantially linear structure and in which the molar ratio of isocyanate groups to the sum of all of the groups containing Zerewitinoff-active hydrogen atoms is in the range of about 0.95 to 1.05, preferably about 0.95 to 1.03 and in particular about 0.95 to 1.0, (II) component (Ab) is based on high melting polyisocyanate polyaddition products of
  ($\alpha$) low molecular compounds with molecular weights of 18 to 399 containing at least two Zerewitinoff-active hydrogen atoms, preferably water or di- and/or polyamines and
  ($\beta$) organic di- and/or polyisocyanates, preferably with molecular weights below 400 in a molar ratio of NCO to active hydrogen in the range of about 0.8:1 to 1.3:1, preferably about 0.85:1 to 1.1:1, in particular about 0.95:1 to 1.1 contained in the relatively high molecular weight, bifunctional compounds (Aa) as a finely divided dispersion having an average particle size of about 0.01 to 25 $\mu$m, preferably about 0.1 to 5 $\mu$m, in particular about 0.1 to 1.5 $\mu$m, the dispersed polyaddition products (Ab) having, as such, melting points above about 220° C., preferably above about 260° C., and their dispersion in component (Aa) remaining stable and finely divided, without decomposing or dissolving, at least up to a temperature of about 240,C, the polyadducts (Ab) being present in a quantity of about 0.66 to 15% by weight, preferably about 1 to 10% by weight, in particular about 2 to 6% by weight, based on the polyadduct-containing polyurethane elastomers, and (III) the elastomers are converted by extrusion, film-blowing or calendering processes at processing temperatures above about 110° C., preferably about 110° to 230° C., in particular about 175° to 210° C., into thin-walled, matte molded articles, films or tubes having wall thicknesses below about 2 mm, preferably about 5 $\mu$m to 500 $\mu$m, most preferably about 20 to 200 $\mu$m, in which the polyadducts (Ab) are homogeneously distributed in a finely divided form within the thin-walled molded product.

This invention is also directed to the non-blocking, matte, thin-walled molded articles, films and tubes obtainable according to the invention and their use for the production of composite polyurethane foam products which have excellent adherence strength between the thin-walled molded structure and the foam and can easily be thermally welded or bonded.

DETAILED DESCRIPTION OF THE INVENTION

In the polyadducts (Ab), preferably at least one of the components, i.e. either the diisocyanate ($\alpha$) or the chain-lengthening agent or cross-linking agent ($\beta$) has a symmetric structure.

The preparation of dispersions (A) from relatively high molecular weight, difunctional compounds (Aa) and relatively high melting polyadducts (Ab) based on polyisocyanates may be carried out by known methods. According to DE-AS No. 1 260 142, such dispersions may be obtained by introducing a solution of a polyamine component (e.g. diamines or hydrazine) in the relatively high molecular weight polyether diol into the reaction vessel and adding the diisocyanate dropwise at room temperature. For preparing dispersion polyols for the purpose of the present invention, it is also advisable to carry out the above-mentioned processes in the presence of solvents, e.g. acetone, methyl ethyl ketone, tetrahydrofuran or the like, which can be removed by distillation after the reaction.

According to DE-OS Nos. 2 550 796 and 2 550 797, stable dispersions of polyadducts in dispersing agents consisting of compounds containing hydroxyl groups may also be obtained with a lower viscosity if the reaction of polyisocyanates with amino functional compounds is carried out in the presence of smaller quantities of water. According to the teaching of DE-OS Nos. 2 513 815; 2 550 833 and 2 550 862, relatively low viscosity of dispersions of polyureas and/or polyhydrazodicarbonamides both in relatively high molecular weight and possibly also low molecular weight compounds containing hydroxyl groups may be prepared by carrying out the polyaddition reaction continuously in flow mixers. This method is particularly suitable for the preparation of dispersions (A) for the purpose of the present invention.

The use of such polyurea and/or polyhydrazodicarbonamide dispersions in polyethers containing 2 to 8 hydroxyl groups for the production of polyurethane foams having improved mechanical properties is described in DE-OS Nos. 2 513 816 and 2 519 004.

German Offenlegungsschrift No. 1 769 869 describes the use of polyurea or polyhydrazodicarbonamide dispersions, preferably in polyesters, for the preparation of cross-linked polyurethane elastomers which have improved resistance to hydrolysis. These elastomers are worked up into thick-walled molded products, e.g. ceiling materials, shoe sole materials, toothed belts, gear wheels, wear-resistant linings and valve seats, preferably by the reaction casting process or also by injection molding.

DE-OS No. 2 723 293 describes reactive coating systems based on polyols with polyadduct dispersions, preferably of polyhydrazodicarbonamides in polyethers, in which the polyols have a hydroxyl functionality of 2.5 to 3.5.

The preparation of dispersions of polyurethanes obtained from diisocyanates and diols containing primary hydroxyl groups in polyethers containing secondary hydroxyl groups is described in DE-AS No. 1 168 075 and the preparation of polyureas and polyhydrazodicarbonamides in polypropylene glycol ethers is described in DE-AS No. 260 142.

Common to all these publications is the use of polyadduct dispersions in polyols leading to more or less highly cross-linked polyurethane systems. The special suitability of the polyols selected according to the invention, with polyadducts dispersed therein, for the preparation of substantially linear, thermoplastic polyurethane elastomers to be used for the production of thin-walled molded products by extrusion, calendering or blow-molding at the high melting temperatures of polyurethane elastomers, and the anti-blocking effect and reduced tackiness obtainable, were not known and not to be expected on the basis of previous experience. On the contrary, the existing state of knowledge would have led one to expect, for example, inhomogeneous surfaces on the thin-walled molded products due to optically disturbing hard segment associations of the non-fusible polyadducts. In DE-OS No. 2 842 806, for example, which describes a process for the preparation of segmented, thermoplastic polyurethanes with controlled formation of hard segment regions, it is taught, on page 6, lines 22 to 25, that a primarily produced pure hard segment would require undesirably high reaction temperatures for the formation of a homogeneous reaction mass, owing to its high melting point. Furthermore, numerous polyols containing polyadducts which have been described in prior publications are found to be unsuitable, e.g. those which show signs of decomposition at the high processing temperatures employed (e.g. polyaddition products of di- and polyhydrazide compounds) and which melt and decompose, also certain polyadducts based on hydrazine, which are stable only at low processing temperatures, or polyaddition products which partly or completely dissolve in the polyols or polyurethane products based on diols and asymmetric diisocyanates, polyaddition products of branched chain diols and diisocyanates, polyaddition products based on secondary diamines, and polyaddition products of asymmetric diisocyanates and asymmetric diamines and/or asymmetrically structured diols, e.g. polyadducts of tolylene diisocyanate and isophorone diamine or of isophorone diisocyanate and isophorone diamine or of tolylene diisocyanate and 1,2-propylene glycol.

It was therefore surprising that completely homogeneous, matte, thin-walled molded products and sheets or films with little tendency to tackiness could be obtained according to the invention using polyadduct/diol dispersions of the type characterized according to the invention. Particularly surprising was the finding that when the procedure according to the invention was employed, the linear thermoplastic polyurethanes could be processed with much more reliable results than conventional thermoplastic polyurethanes since they can be converted into homogeneous molded articles over a much wider range of isocyanate indexes.

Due to the use according to the invention of the characterized dispersions (A), the linear polyurethane elastomers prepared from them give rise to thin-walled molded articles or films with matte, non-blocking and tack-free surfaces and a dry feel. When compared to conventional thermoplastic polyurethanes of about the same hardness, they require considerably less mold release agents, release waxes or internal mold release agents such as stearylamide. This saving in mold release agents amounts to at least 25% and in many cases over 50%, with the result that the molded products obtained from linear thermoplastic polyurethanes according to the invention are much less liable to show signs of efflorescence or migration under critical conditions. Other unexpected advantages of the thin-walled molded products of linear polyurethane elastomers include the improved adherence of foams when reactive polyurethane foam mixtures are applied or backfilled or laminated on such molded products, as well as the greater ease with which these molded products can be bonded and welded in spite of the high melting polyaddition products contained in them. Therefore, an additional object of the present invention is the use of thin-walled molded articles, in particular sheets and films or tubes, for covering polyurethane foams on one side or enclosing them, these foams being preferably applied to the molded articles as a reactive PU mixture.

Such laminated polyurethane foams may be used as elastic, semi-rigid or rigid composite foam bodies, e.g. in the motor car industry for anti-glare shields, upholstered arm rests or shock absorbers; or for cushions and the like, (e.g. the inner shoe in ski boots).

Back-foaming may be carried out by the usual methods employed for polyurethane foam production and the formation of composite bodies. The thin-walled molded articles or foils may be pigmented, colored, embossed or lacquered as desired or otherwise altered in their surface structure in the usual manner. They can easily be used for further processing owing to the ease with which they can be welded. Examples include the welding of sheets for bed underlays, diapers, OP sheets, shower curtains, serving trays and the bonding of sheets to other polymers. Further examples include inflatable bodies on the inside of ski shoes, life jackets, textile coatings and flat roofing sheets.

The substantially linear, relatively high molecular weight compounds (Aa) with molecular weights from 400 to about 10,000, preferably from about 450 to 6000 and melting points below 60° C., preferably below 50° C., used for the invention may be virtually any known compounds of this description containing about 2 groups which are reactive with isocyanates at the reaction temperatures employed, i.e., groups with so-called Zerewitinoff-active hydrogen atoms, such as hydroxyl, primary and/or secondary amino, SH or carboxyl groups or other reactive groups, e.g. hydrazide groups. These compounds may be linear, i.e., approximately bifunctional, polyesters, polylactones, polyethers, polythioethers, polyester amides, polycarbonates, polyacetals or vinyl polymers with functional end groups or compounds already containing urethane or urea groups; the compounds containing the above mentioned groups having Zerewitinoff-active hydrogen atoms, preferably hydroxyl groups. These compounds are known in the art and have been fully described in, for example, DE-OS Nos. 2 302 564: 2 423 764; 2 549 372 (U.S. Pat. No. 3,963,679); DE-OS No. 2 402 840 (U.S. Pat. No. 3,984,607); DE-AS No. 2 457 387 (U.S. Pat. No. 4,035,213); DE-OS No. 2 854 384 and DE-OS No. 2 920 501.

These relatively high molecular weight compounds are preferably compounds containing hydroxyl groups, e.g. polyester diols obtained from straight chained or branched aliphatic and/or cycloaliphatic diols and aliphatic dicarboxylic acids, in particular adipic acid with the possible inclusion of minor quantities of aromatic dicarboxylic acids such as phthalic acid, optionally terephthalic acid, and their hydrogenation products; hydroxypolycarbonates, hydroxypolycaprolactones: and polyether diols such as hydroxypolyethylene oxides, hydroxypolypropylene oxides, hydroxypolytetrahydrofurans and mixed polyethers of propylene oxide and/or ethylene oxide and/or tetrahydrofuran.

Instead of these preferred relatively high molecular weight diol compounds, relatively high molecular weight compounds containing terminal mercapto groups may be used, e.g. polythioethers.

Relatively high molecular weight polyamino compounds may optionally be used, preferably compounds having primary aromatic amino groups. Preferred representatives of such compounds are prepared by hydrolysis of the corresponding isocyanate prepolymers based on relatively high molecular weight polyhydroxyl compounds and excess aromatic diisocyanates, preferably by alkaline hydrolysis. Examples of such processes are given in DE-OS No. 2 948 419, DE-OS No. 3 039 600, FR-OS No. 3 112 118, DE-P-A No. 61 627, EP-A-71 132, EP-A No. 71 139 and EP-A No. 97 869. The first mentioned Patent Specification also cites other state of the art processes for the preparation of aromatic amino compounds having a relatively high molecular structure (so-called aminopolyethers) which are suitable for the process according to the invention. Other methods of preparation are described in DE-AS No. 1 694 152, FR-PS No. 1 415 317 and DE-AS No. 1 155 907. When aromatic amino polyethers are used as (Aa). the polyadducts (Ab) are preferably polyadducts of (cyclo)aliphatic diamines and diisocyanates.

Although the polyadducts could in principle also be dispersed in chain lengthening agents, preferably in di- and/or polyols having molecular weights of 62 to 399, the quantity of polyadducts which can be dispersed in these compounds is in most cases limited and, more importantly, only limited quantities of chain lengthening agents can be built into the polyurethane elastomers, with the result that the proportion of polyadducts (Ab) in the TPU elastomers is then in most cases also insufficient. Such a procedure is therefore normally not preferred.

The relatively high molecular weight, high melting polyisocyanate polyaddition products (Ab) dispersed in the relatively high molecular weight difunctional compounds Aa) are polyisocyanate polyaddition products ("polyadducts") prepared from low molecular compounds with molecular weights of 18 to 399 containing at least two Zerewitinoff-active hydrogen atoms and organic di- and/or polyisocyanates having molecular weights below 400, preferably using a ratio of NCO/-Zerewitinoff-active hydrogen in the range of about 0.8:1 to 1.3:1, in particular approximately equivalent quantities. These compounds (Ab) are present in the form of a finely divided dispersion with an average particle size of about 0.01 to 25 $\mu$m, preferably about 0.1 to 5 um, in particular about 0.1 to 1.5 $\mu$m in the relatively high molecular weight, substantially linear compounds (Aa).

According to the invention, compounds may only be used as polyadducts (Ab) which have melting points above 220° C., preferably above 260° C. It is an additional requirement that when dispersed in dispersing agent (Aa), polyadducts (Ab) remain stable and finely divided (without decomposing or dissolving) at least up to temperatures 15° higher, preferably up to 30° higher than the processing temperature used for the particular polyurethane elastomer (preferably up to 240° C., in particular up to 260° C.) and do not decompose or dissolve in the reaction mixture or the polyurethane elastomer products at the processing temperatures employed for the polyurethanes. These temperatures may be up to about 240° C., but in most cases are about 110° to 230° C., preferably about 175° to 210° C.

In the selected polyadducts (Ab) according to the invention, preferably at least one of the components, i.e. either the diisocyanate ($\beta$) or the chain lengthening agent or cross-linking agent ($\alpha$), is symmetrical in structure. It is also preferred that at least one of the components of the relatively high molecular weight, high melting polyadducts (Ab) should be different from the chain lengthening agents (B) or from the diisocyanates (C) used for the preparation of the polyurethane elastomers.

The following are examples of symmetric diisocyanates: 1,4-phenylenediisocyanate, diphenyl-4,4'-diisocyanate, 4,4'-dimethyl-diphenyl-3,3'-diisocyanate, diphenylmethane-4,4'-diisocyanate, diphenylethane-4,4'-diisocyanate, 3,3'-dimethyl-diphenylmethane-4,4'-diisocyanate, diphenylether-4,4'-diisocyanate, paraxylylenediisocyanate, $\alpha,\alpha,\alpha',\alpha'$-tetramethyl-paraxylylenediisocyanate, naphthylene-1,5-diisocyanate, 4,4'-dimethyl-3,3'-diisocyanato-N,N'-diphenylurea and dimeric 4,4'-diisocyanato-diphenylmethane: and cycloaliphatic and aliphatic diisocyanates such as 1,4-acyclohexanediisocyanate, dicyclohexyl-4,4'-diisocyanate, dicyclohexylmethane-4,4'-diisocyanate, 3,3'-dimethyl-dicyclohexylmethane-4,4'-diisocyanate, hexamethylenediisocyanate, tetramethylene diisocyanate and dodecamethylene diisocyanate.

Mixtures of 4,4'-diphenylmethane-diisocyanate with higher nuclear diisocyanates which may be obtained by phosgenating crude polyamine mixtures resulting from the condensation of aniline and formaldehyde; modified polyisocyanates, e.g. carbodiimidized or urethanized mixtures of diphenylmethane diisocyanates; and polyisocyanates having three or more isocyanate groups may also be used.

The following are examples of symmetric compounds having two isocyanate reactive hydrogen atoms: aromatic diamines such as para-phenylenediamine, 4,4'diphenyldiamine, diphenylmethane-4,4'-diamine, 3,3'-dimethyldiphenylmethane-4,4'-diamine, diphenylethane-4,4'-diamine, diphenylether-4,4'-diamine, para-xylylenediamine, $\alpha,\alpha,\alpha',\alpha'$-tetramethyl-para-xylylenediamine and naphthylene-1,5-diamine; and cycloaliphatic and aliphatic diamines such as 1,4-cyclohexanediamine, dicyclohexylmethane-4,4'-diamine, dicyclohexylethane-4,4'-diamine, dicyclohexylether-4,4'-diamine, 3,3'-dimethyldicyclohexylmethane-4,4'-diamine, hexamethylene-1,6-diamine, tetramethylene-1,4-diamine and dodecamethylene1,12-diamine. Examples of symmetric diols include ethylene glycol, butane-1,4-diol, hexane-1,6-diol, octane-1,8-diol and cycloaliphatic diols such as 1,4-dihydroxycyclohexane and 2,5-dimethyl-1,4-dihydroxycyclohexane and symmetric derivatives such as hydroquinonebis-($\beta$-hydroxyethyl)-ether and terephthalic acid-bis-($\beta$-hydroxyethyl)-ester.

It is particularly preferred for the invention to use polyadducts obtained from the above-mentioned symmetric diisocyanates and the above-mentioned symmetric compounds containing reactive hydrogen atoms. These compounds give rise to very high melting polyadducts which are stable in the relatively high molecular weight, difunctional compounds (Aa) even when heated to 240° C., in particular to 260° C., and remain finely divided without decomposing or dissolving.

Reaction products of symmetric aromatic diisocyanates and symmetric diamines are preferred, and reaction products of symmetric aromatic diisocyanates and symmetric aromatic diamines are particularly preferred. Examples include polyureas of diphenyl methane-4,4'-diisocyanate and diphenylmethane-4,4'-diamine; diphenylmethane-4,4'-diisocyanate and napthylene-1,5-diamine; diphenyl-methane-4,4'-disocyanate and dicyclohexylmethane-4,4'-diamine; diphenylmethane-4,4'-diisocyanate and 3,3'-dimethyl-dicyclohexylmethane-4,4'-diamine; and diphenylmethane-4,4'-diisocyanate and hexamethylenediamine. High melting polyurethanes obtained from symmetric diisocyanates such as diphenylmethane-4,4'-diisocyanate and symmetric, straight chained diols such as ethylene glycol, butanediol or hexanediol dispersed in polyols containing secondary OH groups may also be used, but are less preferred.

According to the invention, polyadducts in which only of the components is symmetric in structure may also be used, provided their melting point and solubility/thermal stability conforms to the required selected conditions.

Asymmetric di- and/or polyisocyanates used may be any of the usual di- and/or polyisocyanates known from the literature. Examples include the toluylene diisocyanates, diphenylmethane-2,4-diisocyanate, 3'-methyl-diphenylmethane-2,4-diisocyanate and mixtures of predominantly asymmetric isomers with symmetric isomers, e.g. isomeric mixtures of 4,4'-, 2,4'- and optionally 2,2'-diphenylmethane diisocyanate with 4,4'-diphenylmethane diisocyanate.

The following are examples of asymmetric aliphatic or cycloaliphatic diisocyanates: 1-methyl-2,4-cyclohexanediisocyanate, 2,4'-dicyclohexylmethanediisocyanate, isophorone diisocyanate, trimethylhexane diisocyanates and lysine methyl ester diisocyanate.

Asymmetric compounds having two or more isocyanate reactive hydrogen atoms are preferably diand/or polyamines such as 2,4-toluylenediamine, 2,4'-diaminodiphenylmethane, 3,5-diethyl-2,4-toluylenediamine or mixtures thereof with symmetric isomers, 1,3,5-triethyl-2,4-diaminobenzene, 1-methyl-2,4-diaminocyclohexane, isophorone diamine, lysine methyl ester and 2,2,4-trimethyl-hexane-diamine. Polyvalent amines such as diethylene triamine, 1,3,5-triaminocyclohexane or 1,5,11-triaminoundecane are also suitable, but preferably are only used to a limited extent (in minor quantities).

Examples of such polyadducts (Ab) according to the invention having only one symmetrically structured component include polyureas of 2,4-toluylenediisocyanate and diphenylmethane-4,4-diamine: 2,4-toluylenediisocyanate and hexamethylenediamine; diphenylmethane-4,4'-diisocyanate and isophoronediamine and 3-methyl-4,4'-diisocyanato-dicyclohexylmethane and hexamethylenediamine.

Suitable polyadducts obtained from at least one symmetric component include those which have the required melting points above 220° C., are insoluble in the relatively high molecular weight diols (Aa) when heated to 240° C. and remain undissolved in the polyurethanes and in a finely divided state.

Quite particularly preferred, however, are the polyadducts prepared from both symmetric diisocyanates and symmetric polyamines, in particular the polyadducts of symmetric aromatic compounds, for example, of diphenylmethane-4,4'-diisocyanate and diphenylmethane-4,4'-diamine. These compounds have the highest melting points, the greatest stability in the relatively high molecular weight diols, the greatest stability under the conditions employed for preparation and processing and retain their state of finely divided dispersion without any signs of decomposition. Polyureas prepared from symmetric aromatic diisocyanates and water are also particularly suitable for the same reasons, in particular the polyureas of diphenylmethane-4,4'-diisocyanate and water.

Polyadducts based on diisocyanates and hydrazine or hydrazine hydrate are unstable at high temperatures, e.g. at 240° to 260° C., and may undergo partial or complete decomposition at high processing temperatures, e.g. 230° to 240° C. Polyadducts of this kind can only be of limited use and only at low processing temperatures, e.g. up to 210° C., and are therefore less preferred.

Polyadducts of dihydrazide compounds and diisocyanates are in most cases thermally unstable and show signs of decomposition, in particular at the higher processing temperatures.

Polyadducts in which both the diisocyanate component and the diamine component are asymmetric in structure are in most cases unsuitable since they dissolve in the polyurethane either at the stage of preparation of the polyurethane or at the elevated processing temperatures. Examples include reaction products of 2,4-toluylene diisocyanate and toluylene diamines; toluylene diisocyanate and isophorone diamine; and isophorone diisocyanate and isophorone diamine.

Polyurethanes are only suitable as polyadducts (Ab) for the purpose of the invention if synthesized from (preferably) symmetric diisocyanates and symmetric diols, in particular from alkylene diols of the formula HO.(CH$_2$)$_n$.OH; wherein n=2, 4, 6, 8, 10 or 12; or from 1,4-bis-hydroxymethyl-cyclohexane, hydroquinone-bis-(β-hydroxyethyl)-ether or terephthalic acid-bis-(β-hydroxyethyl)-ester.

Polyurethanes with asymmetric, branch chained diol components are in most cases unsuitable for the purpose of the invention since they melt or dissolve in the polyurethane at high processing temperatures. Polyadducts of diisocyanates and diamines containing secondary amino groups have also proved to be unsuitable for the purpose of the invention.

The polyadducts (Ab) to be used according to the invention, preferably polyureas, are prepared by the methods described above, which are known in principle, by reacting the components in proportions corresponding to a ratio of NCO to Zerewitinoff-active hydrogen atoms in the range of about 0.8:1 to 1.3:1, preferably 1:1. The reaction between the components preferably takes place in the relatively high molecular weight compounds (Aa), preferably in relatively high molecular weight diols. The polyadducts are generally contained in the relatively high molecular weight compound (Aa) as finely divided dispersions with an average particle size of about 0.01 to 25 μm, and in a quantity of up to about 60% by weight, preferably about 1 to 40% by weight. More highly concentrated dispersions (A) with higher solids contents of (Ab) may, if necessary, be diluted with additional quantities of relatively high molecular weight compounds (Aa) to adjust the polyadduct concentrations so that about 0.66 to 15% by weight, preferably about 1 to 10% by weight, in particular about 2 to 6% by weight of polyadduct (Ab) is obtained in the PU elastomer substance.

The compounds used as chain lengthening agents (B) with a molecular weight from 18 to 399 containing two Zerewitinoff-active hydrogen atoms include water, diols, amino alcohols, diamines or mixtures of such compounds. Straight chained or branched aliphatic diols with up to 12 carbon atoms are preferred, particularly ethylene glycol, butane-1,4-diol and/or hexane-1,6-diol, neopentyl glycol, 1,4-bis-hydroxymethyl-cyclohexane, hydroquinone-bis-( -hydroxyethyl)-ether and terephthalic acid-bis-( -hydroxyethyl)-ester. Suitable diamines include in particular isophorone diamine and aromatic diamines such as 3,5- and/or 2,4-diaminobenzoic acid esters according to DE-OS No. 2 025 900: diamines containing ester groups as described in DE-OS Nos. 1 803 635, 2 040 650 and 2 160 589: diamines containing ether groups according to DE-OS Nos. 1 770 525 and 1 809 172; 2-halogen-1,3-phenylene-diamines optionally substituted in the 5-position: 3,3'-dichloro-4,4-diamino-diphenylmethane; 4,4'- and/or 2,4'-diamino-diphenylmethane; 4,4'-diamino-diphenyl-sulphides: 4,4'-diamino-dithioethers: 3,5-diethyl-2,4-tolylene-diamine: 3,5-diethyl-2,6-tolylenediamine; 3,3'-dimethyl-diphenylmethane-4,4'-diamine; 3,3',5,5'-tetramethyl-diphenylmethane-4,4'-diamine or mixtures thereof: 1,3,5-triethyl-2,4-diaminobenzene; 3,5-diethyl-3',5'-diisopropyl-diphenylmethane-4,4'-diamine and aliphatic-aromatic diamines such as aminoalkyl-thioanilines according to DE-OS No. 2 734 574.

The following aromatic diamines are preferred: 3,5-diethyl-toluylene-2,4-(and/or 2,6)-diamines; diamines containing ester groups according to DE-OS Nos. 1 803 635, 2,040 650 and 2 160 589 3,3'-dichloro-4,4'-diamino-diphenylmethane; 3,3'-dimethyl-diphenyl methane-4,4'-diamines; and the reaction mixtures obtained from the condensation of 2,5-diethylaniline and 2,5-diisopropyl-aniline with formaldehyde. The diamines may also be used as mixtures with dihydric alcohols, e.g. with butane-1,4-diol or 1,4,3,6-dianhydrohexitols and/or with water. The use of diamines as (B) is, however, considered less advantageous than the use of diols.

Compounds which are monofunctional in their reaction with isocyanates may also be used in minor proportions as so-called chain breakers, e.g. in proportions of about 0.01 to 3% by weight, based on the PU solids content. Examples include monohydric alcohols such as butanol, 2-ethyl-hexanol, isobutyl alcohol and staryl alcohol as well as monoamines such as aniline, dibutylamine, N-methyl-stearylamine, piperidine and N,N-dimethylhydrazine.

Chain lengthening agents (B) which are particularly preferred for the preparation of thermoplastic polyurethanes according to the invention include: ethylene glycol, diethylene glycol, butane-1,4-diol, hexane-1,6-diol, neopentyl glycol, hydroquinone-bis-hydroxyethylether and any mixtures of two or more of these components. Butane-1,4-diol and/or hexane 1,6-diol are particularly preferred.

The diisocyanates (C) to be used for the preparation of the linear thermoplastic polyurethanes are the known state of the art aliphatic, cycloaliphatic, aromatic, araliphatic and/or heterocyclic diisocyanates such as those described, for example, in DE-OS Nos. 2 302 564; 2 423 764; 2 549 372; 2 402 840; 2 457 387: 2 854 384 and 2 920 501. The following diisocyanates are preferred for the purpose of the invention: diphenylmethane-4,4'- and/or 2,4'- and/or 2,2'-diisocyanates, the isomeric toluylene diisocyanates and mixtures thereof, naphthylene-1,5-diisocyanate, dimeric toluylene-2,4-diisocyanate, hexamethylene diisocyanate, isophorone diisocyanate, trimethylhexane diisocyanate, lysine ester diisocyanates, xylylene diisocyanates and dicyclohexylmethane-4,4'- and/or 2,4'- and/or 2,2'-diisocyanates. Diphenylmethane diisocyanates containing predominant proportions of 4,4'-diisocyanate isomers and mixtures thereof with 2,4'- and/or 2,2'-isomers are of particular industrial importance.

Auxiliary agents and additives (D) optionally used include the conventional catalysts such as tertiary amines, metal salts or organometallic compounds: dyes and pigments; fillers and stabilizers such as UV absorbents, phenolic antioxidants, light-protective agents, lubricants, silicones, flame-retarding agents and fungistatic and/or bacteriostatic substances.

Preparation of the polyurethanes containing the relatively high molecular weight polyadducts follows the principles of the usual processes of polyurethane chemistry for the continuous or intermittent production of elastomers in one or more stages. In the intermittent processes, for example such as that described in DE-AS No. 1 106 969, components (A), (B) and (C) and optionally (D) are vigorously mixed in the calculated proportions of about 80° to 100° C. for about 1 minute and poured out on metal plates. The reaction mixture is cured by after-heating, e.g. at 110° C. for 30 minutes, and then granulated. Alternatively, components (A) and (C) may first be reacted together at 60° to 80° C. to form a prepolymer containing isocyanate groups, which is then vigorously mixed with chain-lengthening agent (B) and optionally additives (D) in a second stage of the reaction and poured out on the metal plates and cured. Preferably, however, the polyurethane elastomers according to the invention are produced by a continuous process, for example according to DE-AS No. 2 302 564, in which components (A) to (D) or an isocyanate prepolymer prepared from components (A) and (C) in a preliminary stage and components B and D are continuously fed in the calculated proportions by weight into a self-cleaning, two-shaft screw reactor which has screws rotating in the same direction and is equipped with kneading and conveyor elements and heated to about 180° to 200° C., and the product melt discharged from the end of the screw is cooled and solidified to form a strand which is then granulated.

The process according to the invention for producing the matte, non-blocking, thin-walled molded articles is carried out by extrusion, calendering or blow molding, normally at temperatures of up to about 240° C., for example about 110° to 230° C., preferably about 175° to 210° C. (PU mass temperature) to result in molded articles, films or tubes having wall thicknesses below about 2 mm, preferably about 5 μm to 500 μm, most preferably about 20 μm to 200 μm. The thermoplastic polyurethanes according to the invention can be used in various manufacturing processes for the production of matte films which may be either tack-free or considerably reduced in their blocking tendency. Thus, non-blocking flat films can be extruded in a thickness of about 0.05 to 2 mm. Tubular films are preferably produced in a thickness of about 0.2 to 0.5 mm. Blown films are advantageously produced in a thickness of about 20 to 300 μm.

These extruded or blown films may readily be back-foamed with polyurethane foam reactive mixtures. The adherence of the matte films according to the invention to the foam is considerably better than that of conventional polyurethane films not according to the invention which have been produced without the addition of the polyadducts used according to the invention. Another remarkable feature is the agglomerate-free distribution of the finely dispersed particles of polyadducts in the films, which is advantageous for many purposes in enabling a high degree of homogeneity to be obtained together with the desired freedom from tackiness.

Extrusion of films was carried out by means of a single shaft extruder of the type Extrusiograph 25 D of Brabender equipped with a film blowing head. The polyurethane melt extruded through a ring nozzle was blown up to the desired wall thickness by suitably controlling the supporting and cooling air.

The following Examples serve to illustrate the process according to the invention. The quantities given are to be understood as parts by weight or percentages by weight unless otherwise indicated.

EXAMPLES

Example 1

(a) Preparation of the dispersion of a polyurea in polyester diol 2212 g per minute of a mixture of 30 g of 4,4'-diaminodiphenylmethane in 2182 g of butane-1,4-diol/adipic acid polyester diol (OH number 52.7, acid number 0.9) were continuously fed into a porcupine mixer (volume of chamber 1.5 l, speed of rotation 1500 revs/min) tempered to 80° C., and 38 g per min. of 4,4'-diisocyanatodiphenylmethane were fed in separately. After a swell time of about 40 seconds, a cream colored, homogeneous dispersion which had almost completely reacted was discharged from the porcupine mixer. The dispersion was transferred to a residence vessel where it was kept at 80° C. with stirring. The dispersion polyol was stable for 5 minutes up to a temperature of at least 240° C. and had the following characteristic data:

Hydroxyl number: 51.1
Acid number: 0.9
Viscosity (80° C.): 1850 mPa.s
Average particle size of the dispersed particles: 0.7 μm
Dispersion content: 3.04% solids in the dispersion.

(b) Preparation of the thermoplastic polyurethane in a two-shaft screw extruder

Formulation:
100 parts of dispersion polyl (1a),
8 parts of butane-1,4-diol and
0.3 part of stearylamide as internal release agent
were reacted in known manner with different proportions of 4,4'-diisocyanatodiphenylmethane (NCO/OH ratio from 0.98 to 1.02) in experiments (A) to (G) in a two-shaft reaction extruder as described in German Pat. No. 2 302 564. The following proportions were used:

(A) 33.13 parts of 4,4'-diisocyantodiphenylmethane (NCO/OH=0.98)
(B) 33.47 parts of 4,4'-diisocyanatodiphenylmethane (NCO/OH=0.99)
(C) 33.81 parts of 4,4'-diisocyanatodiphenylmethane (NCO/OH=1.00)
(D) 34.15 parts of 4,4'-diisocyanatodiphenylmethane (NCO/OH=1.01)
(E) 34.49 parts of 4,4'-diisocyanatodiphenylmethane (NCO/OH=1.02)

The two-shaft reaction extruder consisted of two screws 1855 mm in length rotating in the same direction and alternately equipped with kneading and conveyor elements according to German Pat. No. 2 302 564 and had an external diameter of 53 mm.

The temperature of the housing of the reaction extruder was 180° C. in the zone of the product inlet, 200° C. in the middle of the extruder and 180° C. again in the last section. The polyurethane was extruded at the rate of 80 kg/h, with the screws rotating at 250 revs/min.

(c) Production according to the invention of blown films

Over the whole range of proportions (Experiments A to E), the polyurethane 1(b) obtained could be worked up into completely homogenous, matte, non-blocking and tack-free blown films which had the mechanical properties indicated below (see Table 1).

TABLE 1

| Example (1) | A | B | C | D | E |
|---|---|---|---|---|---|
| 100% modulus (MPa) | 4.5 | 4.9 | 4.9 | 4.9 | 5.8 |
| 300% modulus (MPa) | 10.2 | 12.3 | 12.6 | 12.7 | 16.6 |
| Tensile strength (MPa) | 29.8 | 39.6 | 42.7 | 43.4 | 53.4 |
| Elongation at break (%) | 648 | 620 | 615 | 604 | 575 |
| Shore hardness A | 83 | 83 | 83 | 84 | 85 |
| Shore hardness D | 30 | 32 | 33 | 33 | 34 |
| Resilience (%) | 45 | 45 | 47 | 46 | 46 |
| Polyadduct content in the PU elastomer (%) | | | about 2.14 | | |

The processing temperature in the blown film extruder was in the range of 180° C. to 200° C. (product temperature). The blown films obtained had a wall thickness of about 50 μm. (For use as foam composite, see Example 3(d).

Example 2

(Comparison example)

For the preparation of a conventional thermoplastic polyurethane with comparable Shore hardness, the following components were reacted analogously to Example 1b:

100 parts of butane-1,4-diol/adipic acid polyester (OH number 52.7, acid number 0.9),
9.5 parts of butane-1,4-diol and
0.6 parts of stearylamide were reacted with
(A) 37.56 parts of 4,4'-diisocyanatodiphenylmethane (NCO/OH=0.98)
(B) 37.95 parts of 4,4'-diisocyanatodiphenylmethane (NCO/OH=0.99)
(C) 38.33 parts of 4,4'-diisocyanatodiphenylmethane (NCO/OH=1.00)
(D) 38.71 parts of 4,4'-diisocyanatodiphenylmethane (NCO/OH=1.01)
(E) 39.10 parts of 4,4'-diisocyanatodiphenylmethane (NCO/OH=1.02)

The polyurethane obtained gave rise to clear, transparent blown films with strongly blocking surfaces which stuck together in the freshly processed state. Only in formulation (C) could the elastomer be worked up homogeneously, even though with a high tendency to sticking. Formulations (B) and (D) gave rise to only moderately homogeneous films and formulations (A) and (E) gave rise to very inhomogeneous films. The properties of these films are shown in Table 2. For use as foam composite, see Example 3(d).

TABLE 2

| Comparison Example 2 | A | B | C | D | E |
|---|---|---|---|---|---|
| 100% modulus (MPa) | 4.3 | 4.6 | 4.7 | 4.8 | 5.1 |
| 300% modulus (MPa) | 9.9 | 10.7 | 11.0 | 11.7 | 12.5 |
| Tensile strength (MPa) | 30.5 | 37.9 | 40.8 | 42.6 | 48.3 |
| Elongation at break (%) | 641 | 610 | 575 | 543 | 515 |
| Shore hardness A | 83 | 84 | 84 | 84 | 85 |
| Shore hardness D | 32 | 33 | 34 | 34 | 34 |
| Resilience (%) | 44 | 44 | 44 | 43 | 43 |
| Polyadduct content in PU elastomer | | | 0 | | |
| Appearance of films | | | clear, transparent | | |
| Surface properties of films: | | | all have severely blocking surfaces, sticky | | |
| Uniformity of films: | highly inhomogeneous | moderately homogeneous | homogeneous | moderately homogeneous | highly inhomogeneous |

EXAMPLE 3

(a) Dispersion of a polyurea in a polyester-diol mixture

A dispersion polyol which is stable at least up to 240° C. was prepared under the conditions indicated in Example 1a from 50 parts of butane-1,4-diol/adipic acid polyester (OH number 52.7, acid number 0.9), 50 parts of a hexane-1,6-diol/neopentyl glycol/adipic acid copolyester (OH number 60.3, acid number 0.8, molar ratio of diols 65:35), 2.33 parts of 4,4-diaminodiphenylmethane (dissolved in the polyesters) and 2.94 parts of 4,4-diisocyanatodiphenylmethane. The dispersion polyol obtained had the following characteristic data:

Hydroxyl number: 53.4
Acid number: 0.7
Viscosity (80° C.): 3120 mPa.s
Particle size: 0.42 μm
Solids content: 5.00%
Dispersion stable up to at least 240° C.

(b) Thermoplastic polyurethane

A thermoplastic polyurethane was prepared analogously to Example 1 b from
100 parts of dispersion polyol 3a,
6.5 parts of butane-1,4-diol and
0.5 parts of stearylamide
together with one of the following:

(A) 29.51 parts of 4,4'-diisocyanatodiphenylmethane (NCO/OH=0.98)
(B) 29.81 parts of 4,4'-diisocyanatodiphenylmethane (NCO/OH=0.99)
(C) 30.12 parts of 4,4'-diisocyanatodiphenylmethane (NCO/OH=1.00)
(D) 30.42 parts of 4,4'-diisocyanatodiphenylmethane (NCO/OH=1.01)
(E) 30.72 parts of 4,4'-diisocyantodiphenylmethane (NCO/OH=1.02)

(c) Processing to form blown films (according to the invention)

The polyurethane obtained could be processed over the whole range of formulations at product temperatures of 170° C. to 185° C. to produce homogeneous, matte, non-blocking and completely tack-free blown films having a wall thickness of 55 μm and the following mechanical properties (see Table 3):

TABLE 3

| Example 3 | A | B | C | D | E |
|---|---|---|---|---|---|
| 100% modulus (MPa) | 4.7 | 4.9 | 5.0 | 5.1 | 5.3 |
| 300% modulus (MPa) | 8.8 | 9.2 | 9.9 | 10.1 | 11.4 |
| Tensile strength (MPa) | 21.6 | 28.1 | 34.1 | 36.6 | 44.6 |
| Elongation at break (%) | 650 | 617 | 595 | 598 | 556 |
| Shore hardness A | 79 | 79 | 80 | 80 | 80 |
| Shore hardness D | 27 | 28 | 29 | 29 | 30 |
| Resilience (%) | 39 | 41 | 42 | 42 | 43 |
| Polyadduct content (%) in the polyurethane film | | | about 3.65 | | |

(d) Use of the blown films for direct back foaming (according to the invention)

A 100 μm thick film according to Example 3c was placed in the bottom of a rectangular, 4 l aluminum mold and the thoroughly mixed, liquid components of a polyurethane cold foam formulation (for formulation see below) were poured on the film.

When the foam had completely reacted inside the closed mold, the adherence of the TPU film was on a scale ranging from good (i.e. film bonds firmly to the foam and in separation tests it tears only in the foam layer) to "no adherence" (film can be peeled from the foam without resistance and the surface of the foam remains intact in the process).

The film corresponding to Example 3c according to the invention showed firm adherence under these conditions (film cannot be separated without damaging the underlying foam); whereas, the film from Example 4, which is not according to the invention, showed poor adherence to the foam and could be peeled smoothly from the surface of the foam.

In this comparison experiment between different foam-film composites, the molded part was prepared using the following cold foam formulation (bulk density=40 kg/m³).

Component A 100 parts by weight of a polypropylene glycol started on trimethylolpropane and modified with ethylene oxide to result in more than 80% of primary hydroxyl end groups, with an OH number of 28,
3.0 parts by weight of water,
0.6 part by weight of diazabicyclo-(2,2,2)-octane,
0.2 part by weight of bis-dimethylaminoethyl ether,
1.0 part by weight of glycerol,
0.5 part by weight of commercial foam stabilizer (Stabilizer KS 43 of BAYER AG Leverkusen) and
15 parts by weight of trichlorofluoromethane.

Component B 50 parts by weight of an isocyanate consisting of about 20% by weight of 2,4-diphenylmethane diisocyanate, about 65% by weight of 4,4'-diphenylmethanediisocyanate and about 15% by weight of polymeric MDI with an isocyanate content of about 32.5%.

Detailed information on the general preparation of PUR foams may be found in Kunststoff-Handbuch, Volume VII, published by Becker and Braun, Carl Hanser Verlag Munich 1983 (see Chapter 5, in particular pages 212 to 235 and pages 244 to 245).

A similar picture emerged when the blown film of Example 1b according to the invention was compared with Comparison experiment 2. The film of Example 1b according to the invention showed firm adherence (foam tore in separation tests); the film according to Comparison experiment 2 showed poor adherence (film could be peeled from the foam).

EXAMPLE 4

(Comparison example)

A conventional thermoplastic polyurethane elastomer with comparable Shore hardness was prepared in a manner analogous to Example 3b from
50 parts of butane-1,4-diol/adipic acid polyester (OH number 52.7, acid number 0.9),
50 parts of hexane-1,6-diol/neopentyl glycol/adipic acid copolyester (OH number 60.3, acid number 0.8),
8 parts of butane-1,4-diol,
8 part of stearylamide and
one of the following quantities of diisocyanate:
(A) 34.31 parts of 4,4'-diisocyanatodiphenylmethane (NCO/OH=0.98)
(B) 34.66 parts of 4,4'-diisocyanatodiphenylmethane (NCO/OH=0.99)
(C) 35.01 parts of 4,4'-diisocyanatodiphenylmethane (NCO/OH=1.00)
(D) 35.36 parts of 4,4'-diisocyanatodiphenylmethane (NCO/OH=1.01)
(E) 35.71 parts of 4,4'-diisocyanatodiphenylmethane (NCO/OH=1.02).

Only formulations with (C) and (D) could be worked up with sufficient homogeneity to produce clear, transparent blown films which, however, had a severely blocking surface and stuck together in the freshly processed state.

EXAMPLE 5

(a) Preparation of the dispersion polyol (starting material)

A dispersion polyol which was stable up to at least 240° C. when heated was obtained under the reaction conditions of Example 1A from
100 parts of a linear polypropylene glycol (OH number 59.4),
2.33 parts of 4,4'-diaminodiphenylmethane and
2.94 parts of 4,4'-diisocyanatodiphenylmethane.

The dispersion polyol obtained had the following characteristic data:
Hydroxyl number: 56.5
Viscosity (80° C.): 345 mPa.s
Melting point of polyadduct at least 260° C.
Average particle size: 3.37 μm Solids content (based on the mixture): 5.0%
Stability of polyol mixture up to at least 240° C. (5 minutes heating as test).

(b) Thermoplastic polyurethane (composition according to the invention)

In a first reaction stage, 100 parts of dispersion polyol 5(a) were reacted with 95 parts of 4,4'-diisocyanatodiphenylmethane to produce a prepolymer having an isocyanate content of 14.18%.

In a second reaction stage,
100 parts of butane-1,4-diol/adipic acid polyester (OH number 51.4, acid number 0.7),
25 parts of butane-1,4-diol,
0.2 part of 2,6-di-tert.-butyl-4-methylphenol and
1.5 parts of stearylamide were reacted in each case with one of the following quantities of prepolymer:
(A) 188.00 parts of prepolymer (NCO/OH=0.98)
(B) 189.92 parts of prepolymer (NCO/OH=0.99)
(C) 191.84 parts of prepolymer (NCO/OH=1.00)
(D) 193.76 parts of prepolymer (NCO/OH=1.01)
in a two-shaft reaction extruder under the conditions indicated in Example 1b to produce thermoplastic polyurethanes.

(c) Processing to produce blown films (according to the invention)

Elastomers 5(b) were worked up over the whole range of quantities, (A) to (D) at product temperatures Cfrom 200° C. to 210° C. to produce homogeneous, slightly matte, non-blocking, tack-free blown films 50 μm, in thickness with a slightly granular surface or extruded to form thin-walled tubes with a wall thickness of 300 μm and non-blocking surface (see Table 4).

TABLE 4

| Example 5 | A | B | C | D |
|---|---|---|---|---|
| 100% modulus (MPa) | 6.9 | 7.3 | 7.2 | 7.4 |
| 300% modulus (MPa) | 13.0 | 12.5 | 13.6 | 15.2 |
| Tensile strength (MPa) | 30.2 | 38.8 | 35.5 | 35.1 |
| Elongation at break (%) | 542 | 654 | 542 | 505 |
| Shore hardness A | 88 | 87 | 88 | 87 |
| Shore hardness D | 36 | 31 | 36 | 37 |
| Resilience (%) | 36 | 35 | 36 | 35 |
| Polyadduct content (%) in the PU elastomers | | about 1.57 | | |

EXAMPLE 6
(Comparison example)

100 parts of polypropylene glycol (OH number 59.4) and 95 parts of 4,4'-diisocyanatodiphenylmethane were first reacted as in Example 5b to form a prepolymer having an isocyanate content of 14.07%. In a second reaction stage,
(A) 189.47 parts of prepolymer (NCO/OH=0.98)
(B) 191.41 parts of prepolymer (NCO/OH=0.99)
(C) 193.34 parts of prepolymer (NCO/OH=1.00) and
(D) 195.27 parts of prepolymer (NCO/OH=1.01)
were each reacted with
100 parts of butane-1,4-diol/adipic acid polyester (OH number 51.4, acid number 0.7),
25 parts of butane-1,4-diol,
0.2 part of 2,6-di-tert.-butyl-4-methylphenol and
2.2 parts of stearylamide
to form a thernoplastic polyurethane having a Shore A hardness of 86 to 88 and Shore D hardness of 34 to 36. Only the conpositions containing quantities (B) and (C) could be worked up with sufficient homogeneity to form clear, transparent foils or tubes, which, however, were strongly blocking and readily stuck together in the freshly processed state.

EXAMPLE 7

(a) Dispersion polyol

A dispersion polyol which was stable up to at least 240° C. when heated was prepared by a method analogous to that of Example 1(a) from 100 parts of butane-1,4-diol/adipic acid polyester (OH number 187.0, acid number 0.9), 1.37 parts of 4,4'-diaminodiphenylmethane and 1.73 parts of 4,4'-diisocyanatodiphenylmethane. The dispersion polyol had an OH number of 181.4, acid number 0.8 and viscosity at 80° C. of 230 mPa.s. The solids content was 3.0% by weight of polyurea with an average particle size of 0.74 μm. The dispersion remained stable when heated to 240° C. for 5 minutes.

(b) Thermoplastic, linear polyurethane elastomer 100 parts of dispersion polyol 7(a).
7 parts of hexane-1,6-diol,
0.5 part of butane-1,4-diol and
0.5 part of stearylamide
were reacted under the conditions of Example 1(b) with
(A) 56.28 parts of 4,4'-diisocyanatodiphenylmethane (NCO/OH=0.99) or
(B) 56.85 parts of 4,4'-diisocyanatodiphenylmethane (NCO/OH=1.00) or
(C) 57.42 parts of 4,4'-diisocyanatodiphenylmethane (NCO/OH=1.01)
to form a thermoplastic, linear polyurethane elastomer which had the properties indicated below (see Table 5).

TABLE 5

| Example 7 | A | B | C |
|---|---|---|---|
| 100% modulus (MPa) | 9.9 | 11.0 | 10.0 |
| 300% modulus (MPa) | 21.4 | 24.4 | 24.2 |
| Tensile strength (MPa) | 39.9 | 45.0 | 43.4 |
| Elongation at break % | 452 | 446 | 436 |
| Shore hardness A | 91 | 91 | 91 |
| Shore hardness D | 40 | 40 | 40 |
| Resilience (%) | 27 | 26 | 25 |
| Polyadduct content (%) (in the PU elastomer) | | 1.82 | |

(c) Processing to form calendered films (according to the invention)

All three elastomer formulations could easily be worked up into calendered films 125 in thickness which had a tack-free, matte, non-blocking surface and dry feel. The product melt could easily be removed from the calendering roller at processing temperatures of 180° C. to 200° C. The calender used was a melt roll calender of Maurer S.A., Berne (Switzerland).

EXAMPLE 8

(a) Dispersion polyol 100 parts of polytetramethylene glycol (OH number 113.5),
2.33 parts of 4,4'-diaminodiphenylmethane and
2.94 parts of 4,4'-diisocyanatodiphenylmethane were reacted together as in Example 1(a) to produce a dispersion polyol which was stable up to at least 240° C. and had the following characteristic data:
OH number: 110.3

Viscosity (80° C.): 690 mPa.s
Average particle size: 0.96 μm
Solids content: 5.0%

(b) Thermoplastic, linear polyurethane 100 parts of dispersion polyol 8(a),
8 parts of butane-1,4-diol,
0.4 part of stearylamide and
0.2 part of 2,6-di-tert.-butyl-4-methylphenol
were reacted as in Example 1(b) with
(A) 46.35 parts of 4,4-diisocyanatodiphenylmethane (NCO/OH=0.99) or
(B) 46.82 parts of 4,4-diisocyanatodiphenylmethane (NCO/OH=1.00) or
(C) 47.28 parts of 4,4-diisocyanatodiphenylmethane (NCO/OH=1.01)
to produce a thermoplastic polyurethane.

(c) Processing to produce extrusion tubes (according to the invention)

All three formulations could be extruded with very good homogeneity at material temperatures of 180° C. to 190° C. to form tubes or blown to form films which were distinguished by their non-blocking, tack-free, matte surfaces and had wall thicknesses of 60 μm and 300 μm, respectively. The polyurethane films obtained had the following properties (see Table 6):

TABLE 6

| Example (8) | A | B | C |
|---|---|---|---|
| 100% modulus (MPa) | 5.1 | 5.2 | 5.2 |
| 300% modulus (MPa) | 9.8 | 10.1 | 11.7 |
| Tensile strength (MPa) | 31.2 | 35.4 | 39.5 |
| Elongation at break (%) | 628 | 616 | 592 |
| Shore hardness A | 82 | 82 | 82 |
| Shore hardness D | 30 | 31 | 32 |
| Resilience (%) | 44 | 44 | 44 |
| Polyadduct content (%) in the PU elastomers | about 3.22 | | |

EXAMPLE 9

(a) Dispersion polyol 100 parts of butane-1,4-diol/adipic acid polyester (OH number 55.8, acid number 0.8),
0.87 part of hydrazine hydrate and
4.39 parts of 4,4'-diaminodiphenylmethane
were reacted as described in Example 1(a). After dehydration under vacuum at 100° C., a dispersion polyol having the following characteristic data was obtained:
OH number: 53.2
Acid number: 0.8
Viscosity (80° C.): 160 mPa.s
Average particle size: 0.88 μm
Solids content: 5.0% by weight.

Dispersion polyol 9(a) began to show signs of decomposition of the polyhydrazodicarbonamide at about 200° C. and formed a clear solution from about 240° C. upwards.

(b) Thermoplastic polyurethane (soft formulation)

100 parts of dispersion polyol 9(a),
8 parts of butane-1,4-diol and
0.3 part of stearylamide
were reacted with
(A) 33.57 parts of 4,4'-diisocyanatodiphenylmethane (NCO/OH=0.98),
(B) 33.92 parts of 4,4'-diisocyanatodiphenylmethane (NCO/OH=0.99),
(C) 34.26 parts of 4,4'-diisocyanatodiphenylmethane (NCO/OH=1.00) or
(D) 34.60 parts of 4,4'-diisocyanatodiphenylmethane (NCO/OH=1.01)
to produce a thermoplastic, linear polyurethane (TPU) by a discontinuous batch casting process in which the reactants were vigorously mixed together at 100° C. for one minute, poured out on a metal plate and heated to 110° C. for 30 minutes. The TPU obtained had the following properties (see Table 7):

TABLE 7

| Example 9 | A | B | C | D |
|---|---|---|---|---|
| 100% modulus (MPa) | 7.5 | 8.1 | 8.5 | 7.9 |
| 300% modulus (MPa) | 19.5 | 20.4 | 20.4 | 21.2 |
| Tensile strength (MPa) | 38.1 | 43.0 | 41.6 | 40.5 |
| Elongation at break (%) | 525 | 506 | 583 | 576 |
| Shore hardness A | 89 | 88 | 86 | 87 |
| Shore hardness D | 40 | 38 | 38 | 40 |
| Resilience (%) | 40 | 40 | 39 | 39 |
| Polyadduct content (%) (in the PU elastomer) | about 3.50 | | | |

All formulations could be worked up at material temperatures of up to 185° C. to form homogeneous blown films 65 μm in thickness which had a tack-free, non-blocking, matte surface and dry feel. The dispersion content was finely divided and homogeneously distributed and formed a slight cloudiness in the elastomer.

(c) Thermoplastic polyurethane—harder formulation (comparison)

100 parts of dispersion polyol 9(a),
12 parts of butane-1,4-diol and
0.3 part of stearylamide
were reacted with 45.36 parts of 4,4'-diisocyantodiphenyl-methane (NCO/OH=1.00) by a method analogous to that of experiment 9(b) to form a harder polyurethane with a Shore A hardness of 94, which required a processing temperature of at least 200° C. for the molten product. Owing to the thermal instability of the dispersion, only an inhomogeneous blown film with unevenly distributed, cloudy hard segment associations could be obtained under these conditions. Dispersion polyol 9(a) is therefore only suitable for low melting TPU since polyadduct (Ab) has a low decomposition temperature.

EXAMPLE 10

(a) Dispersion polyol 1919 g per minute of a mixture of 119 g of butane-1,4-diol in 1800 g of polypropylene glycol (OH number 59.4) and 330.4 g of 4,4'-diisocyanatodiphenylmethane were continuously fed into the porcupine mixer indicated in Example 1(a) which was maintained at a temperature of 60° C. The reaction mixture discharged from the apparatus was then stirred for 3 hours at 80° C. in a residence vessel. A dispersion which was stable up to 230° C. and had the following characteristic data was obtained:
Hydroxyl number: 48.0
Viscosity (80° C.): 510 mPa.s
Average particle size: 4.42 μm
Solids content: 20%.

(b) Thermoplastic, linear polyurethane elastomer

A prepolymer (14.18% NCO) was prepared in a first reaction stage as in Example 5(b) from 25 parts of dispersion polyol 10(a), 75 parts of polypropylene glycol (OH number 59.4) and 95 parts of 4,4'-diisocyanatodiphenylmethane. The prepolymer was vigorously mixed in the following quantities:
(A) 188.00 parts (NCO/OH=0.98) or
(B) 189.92 parts (NCO/OH=0.99) or
(C) 191.84 parts (NCO/OH=1.00) or
(D) 193.76 parts (NCO/OH=1.01)
with
100 parts of butane-1,4-diol/adipic acid polyester (OH number 51.4, acid number 0.7)
25 parts of butane-1,4-diol,
1.5 parts of stearylamide and
0.2 part of 2,6-di-tert.-butyl-4-methyl phenol
at 100° C. for one minute. Then the mixture was poured out onto metal plates and hardened for 30 minutes at 110° C. to form a thermoplastic polyurethane which had the properties indicated below and could easily be processed over the whole range of quantitative proportions given at processing temperatures of 190° C. to 200° C. to form homogeneous, slightly matte, non-blocking, tack-free blown films with a slightly granular surface and a wall thickness of 80 μm or extruded to form thin-walled tubes 300 mm in thickness. The properties of the films are shown in Table 8 below:

TABLE 8

| Example 10 | A | B | C | D |
|---|---|---|---|---|
| 100% modulus (MPa) | 9.3 | 10.2 | 10.2 | 10.2 |
| 300% modulus (MPa) | 14.4 | 16.8 | 17.9 | 18.7 |
| Tensile strength (MPa) | 27.0 | 31.7 | 31.0 | 31.6 |
| Elongation at break (%) | 615 | 598 | 592 | 578 |
| Shore hardness A | 91 | 91 | 90 | 89 |
| Shore hardness D | 35 | 35 | 35 | 36 |
| Resilience (%) | 39 | 38 | 37 | 37 |
| Polyadduct content (%) (in the PU elastomer) | about 1.54 | | | |

EXAMPLE 11

2131 g per minute of polypropylene glycol (OH number 55.3) having a water-content of 5% were reacted with 119 g per minute of 4,4'-diisocyanatodiphenylmethane under the conditions of Example 10(a). The reaction mixture leaving the porcupine mixer was then stirred at 60° C. for 30 minutes until evolution of $CO_2$ ceased. After removal of the excess water by evaporation under vacuum at 100° C., a finely divided, homogeneous dispersion which was stable up to at least 240° C. and had the following characteristic data was obtained:
OH number: 52.4
Viscosity (80° C.): 320 mPa.s
Average particle size: 2.67 μm
Stability of polyurea dispersion: up to at least 240° C.
Solids content: about 5%.

This dispersion polyol was substantially similar to that of Example 5(a) and could be reacted in analogous manner to a thermoplastic, matte, linear polyurethane which was comparable to that of Example 5(b) and could be similarly processed.

EXAMPLE 12

(Comparison example)

(a) Dispersion polyol 100 parts of butane-1,4-diol/adipic acid polyester (OH number 51.4, acid number 0.7),
2.17 parts of 2,4-toluylenediamine and
3.09 parts of toluylene diisocyanate (80% 2,4- and 20% 2,6-isomer)
were reacted according to the instructions given in Example 1(a) to produce the following dispersion polyol:
OH number: 49.4
Acid number: 0.6
Viscosity (100° C.): 5470 mPa.s
Average particle size: 0.35 μm
Solids content: 5.0%.
The dispersion changed into an emulsion above 190° C. (melting or decomposition of the dispersed polyurea component).

(b) Thermoplastic, linear polyurethane 50.0 parts of dispersion polyol (12(a),
50.0 parts of butane-1,4-diol/adipic acid polyester (OH number 51.4, acid number 0.7),
8.0 parts of butane-1,4-diol and
0.3 part of stearylamide
were reacted in a manner analogous to Example 9(b) with 33.6 parts of 4,4'-diisocyanatodiphenylmethane (NCO/OH=1.00) to form a thermoplastic polyurethane which when processed in the melt at the required processing temperature of 195° C. resulted in an inhomogeneous blown film with irregular hard segment agglomerations. Dispersion polyol 12(a) is unsuitable for the polyurethane formulation given above on account of the insufficiently high softening point of its product and possibly also insufficiently high thermostability.

EXAMPLE 13

(a) Dispersion polyol 50 parts of butane-1,4-diol/adipic acid polyester (OH number 52.7, acid number 0.9),
50 parts of hexane-1,6-diol/neopentyl glycol (molar ratio 65/35)/adipic acid copolyester (OH number 60.3, acid number 0.8),
2 15 parts of hexamethylenediamine and
3.11 parts of hexamethylenediisocyanate
were reacted according to the instructions of Example 1(a), to produce a dispersion polyol having the following characteristic data:
OH number: 53.9
Acid number: 0.7
Viscosity (80° C.): 3270 mPa.s
Average particle size: 0.63 μm
Solids content: 5.0%.

The dispersion was heat stable up to 240° C. and began to flocculate at temperatures above 250° C.

(b) Thermoplastic, linear polyurethane 100 parts of dispersion polyol 13(a),
8 parts of butane-1,4-diol and
0.3 part of stearylamide were reacted with
34.39 parts of 4,4'-diisocyanatodiphenylmethane (NCO/OH=1.00)
as in Example 9(b) to produce a thermoplastic polyurethane having the following properties:
100% modulus (MPa): 6.0
300% modulus (MPa): 17.0
Tensile strength (MPa): 46.9
Elongation at break (%): 423
Shore hardness A: 81
Shore hardness D: 32
Resilience (%) 42
Polyadduct content (%): 3.50

The TPU obtained could be worked up at a product temperature of 205° C. to form a blown film (wall thickness 60 m) having a matte, non-blocking and tack-free surface.

EXAMPLE 14

(comparison example)

(a) Dispersion polyol

A dispersion polyol was prepared according to the instructions given in Example 1(a) from
50 parts of butane-1,4-diol/adipic acid polyester (OH number 52.7, acid number 0.9),
50 parts of hexane-1,6-diol/neopentyl glycol/adipic acid copolyester (OH number 60.3, acid number 0.8),
2.28 parts of isophorone diamine and
2.98 parts of isorphorone diisocyanate.
The dispersion polyol obtained had the following characteristic data:
OH number: 54.1
Acid number: 0.8
Viscosity (80° C.): 2050 mPa.s
Average particle size: 0.78 μm
Solids content: 5.0%
The dispersion is stable up to 240° C. From 250° C. upwards, signs of decomposition begin to appear (gases) and a clear solution is formed.

(b) Thermoplastic polyurethane 100 parts of dispersion polyol 14(a),
8.35 parts of butane-1,4-diol,
0.3 part of stearylamide and
35.43 parts of 4,4'-diisocyanatodiphenylmethane (NCO-/OH=1.00)
were reacted in a manner analogous to Example 9(b) to produce a thermoplastic polyurethane having the following properties:
100% modulus (MPa): 5.2
300% modulus (MPa): 14.0
Tensile strength (MPa): 42.9
Elongation at break (%): 459
Shore hardness A: 81
Shore hardness D: 33
Resilience (%): 41
Polyadduct content (%): 3.47.

(c) Processing to form blown films

Films obtained from this TPU at a product temperature of 205° C. were homogeneous, clear and tranparent, but had blocking surface. Owing to the solubility of the polyurea dispersion in the TPU melt, dispersion polyol 14(a) cannot be used in the given polyurethane formulation according to the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed:

1. A process for the production of a matte, non-blocking, thin-walled molded article, film or tube a polyurethane elastomer based on
(A) a dispersion comprising
   (Ab) a relatively high molecular weight, high melting polyisocyanate polyaddition product dispersed in
   (Aa) a relatively high molecular weight, polyfunctional compound containing isocyanate reactive groups with Zerewitinoff-active hydrogen atoms and having a molecular weight of 400 to about 10,000 and a melting point below 60° C.,
(B) a chain lengthening agent with a molecular weight of 18 to 399 containing two Zerewitinoff-active hydrogen atoms and
(C) a diisocyanate, wherein
(I) said polyurethane elastomer is thermoplastically processible, has a substantially linear structure and is prepared at a molar ratio of isocyanate groups to the sum of all of the groups containing Zerewitinoff-active hydrogen atoms of about 0.95 to 1.05,
(II) component (Ab) comprises a high melting polyisocyanate polyaddition product based on (α) a low molecular compound having a molecular weight of 18 to 399 and containing at least two Zerewitinoff-active hydrogen atoms and
(B) an organic di- and/or polyisocyanate in a molar ratio of isocyanate groups to isocyanate reactive groups having Zerewitinoff-active hydrogen atoms of about 0.8:1 to 1.3:1, contained in th relatively high molecular weight, bifunctional compound (Aa) in the form of a finely divided dispersion having an average particle size of about 0.01 to 25 μm, the dispersed polyaddition product (Ab) having a melting point above about 220° C., and its dispersion in component (Aa) being stable and remaining finely divided up to a temperature at least 15 degrees Centigrade higher than the processing temperature of the polyurethane elastomer without decomposing or dissolving, the polyadduct (Ab) being used in a quantity of about 0.66 to 15% by weight, based on the polyurethane elastomer containing the polyadduct, and
(III) converting said polyurethane elastomer by an extrusion, film blowing or calendering process at a processing temperature above about 110° C. into a thin-walled, matte, molded article, film or tube having a wall thickness below about 2 mm, in which the polyadduct (Ab) is finely divided and homogeneously distributed within the thin-walled molded article.

2. The process of claim 1 wherein at least one of (α), or (β) has a symmetric structure.

3. The process of claim 1 wherein at least one of the components of the relatively high molecular weight, high melting polyadduct (Ab) differs from chain lengthening agent (B) or from diisocyanate (C).

4. The process of claim 1 wherein both diisocyanate (β) and said low molecular weight compound (α) are symmetric and polyadduct (Ab) is stable in the relatively high molecular weight, polyfunctional compound (Aa) at 240° C., and remains finely divided without decomposing or dissolving.

5. The process of claim 1 wherein the polyadduct (Ab) is synthesized from a symmetric, aromatic diisocyanate and a symmetric aromatic diamine or water.

6. The process of claim 1 wherein polyadduct (Ab) is synthesized from diphenylmethane-4,4'-diisocyanate and either diphenylmethane-4,4'-diamine or water.

7. The process of claim 1 wherein polyadduct (Ab) is synthesized from a symmetric diisocyanate and a symmetric diol comprising a member selected from the group consisting of alkylene diols of the formula HO(CH$_2$)$_n$OH wherein n=2,4,6,8,10,12; 1,4-bis-hydroxymethyl-cyclohexane; hydroquinone-bis-(β-hydroxyethyl)-ether; and terephthalic acid-bis-(β-hydroxyethyl)-ester.

8. The product produced in accordance with claim 1.

9. The product produced in accordance with claim 6.

10. A process for the production of a polyurethane foam composite structure which comprises back-foaming a polyurethane foam composition in contact with the product of claim 6.

* * * * *

UNITED STATES PATENT AND TRADEMARK OFFICE
CERTIFICATE OF CORRECTION

PATENT NO. : 4,656,199

DATED : April 7, 1987

INVENTOR(S) : Georg Niederdellmann et al

It is certified that error appears in the above-identified patent and that said Letters Patent is hereby corrected as shown below:

At Column 4, line 14, please correct "DE-AS No. 260,142" to --DE-AS 1,260,142--.

At Column 7, line 38, correct "1,4-acy-" to --1,4-cy--.

At Column 7, line 54, correct "4,4'di" to --4.4'-di--.

At Column 7, line 65, correct "dodecamethylene1,12" to --dodecamethylene-1,12--.

At Column 8, line 2, correct "hydroquinonebis" to --hydroquinone-bis--.

At Column 8, line 33, correct "only of the" to --only one of the--.

At Column 8, line 52, correct "diand/or" to --di- and/or--.

At Column 10, lines 21 and 22, correct "(hydroxyethyl)" by inserting --(β-hydroxyethyl)--.

At Column 12, line 43, correct "swell" to --dwell--.

At Column 12, line 61, correct "polyl" to --polyol--.

UNITED STATES PATENT AND TRADEMARK OFFICE
CERTIFICATE OF CORRECTION

PATENT NO. : 4,656,199
DATED : April 7, 1987
INVENTOR(S) : Georg Niederdellmann et al It is certified that error appears in the above-identified patent and that said Letters Patent is hereby corrected as shown below:

At Column 14, lines 50 and 52, correct "4,4" to --4,4'--.

At Column 16, line 34, correct "8 parts" to --0.8--.

At Column 17, line 30, correct "Cfrom" to --from--.

At Column 17, line 66, correct "thernoplastic" to --thermoplastic--.

At Column 22, line 14, correct "(12(a)" to --12a)--.

At Column 22, line 39, correct "2 15" to --2.15--.

At Column 23, line 3, correct "60 m" to --60 µm--.

At Column 23, line 59, correct "tube a polyure-" to --tube from a polyure--.

At Column 24, line 14, correct "B" to --β--.

At Column 24, line 17, correct "in th" to --in the--.

At Column 24, line 39, correct "β" to --(b)--.

UNITED STATES PATENT AND TRADEMARK OFFICE
CERTIFICATE OF CORRECTION

PATENT NO. : 4,656,199

DATED : April 7, 1987

INVENTOR(S) : Georg Niederdellmann et al.

It is certified that error appears in the above-identified patent and that said Letters Patent is hereby corrected as shown below:

At Column 24, line 44, correct "β" to --(b)--.

Signed and Sealed this

Thirteenth Day of September, 1988

Attest:

DONALD J. QUIGG

*Attesting Officer*        *Commissioner of Patents and Trademarks*